United States Patent
Elshafie et al.

(10) Patent No.: US 12,531,691 B2
(45) Date of Patent: Jan. 20, 2026

(54) COMMON REFERENCE SIGNAL RESOURCES FOR BANDWIDTH PART SWITCHING

(71) Applicant: QUALCOMM Incorporated, San Diego, CA (US)

(72) Inventors: Ahmed Elshafie, San Diego, CA (US); Ahmed Attia Abotabl, San Diego, CA (US); Marwen Zorgui, San Diego, CA (US); Konstantinos Dimou, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 18/148,720

(22) Filed: Dec. 30, 2022

(65) Prior Publication Data

US 2024/0223332 A1    Jul. 4, 2024

(51) Int. Cl.
*H04L 5/00* (2006.01)
*H04W 52/02* (2009.01)

(52) U.S. Cl.
CPC .............. *H04L 5/005* (2013.01); *H04L 5/001* (2013.01); *H04W 52/0216* (2013.01)

(58) Field of Classification Search
CPC ......... H04W 52/0216; H04W 52/0219; H04W 52/0222; H04W 52/0212; H04W 52/04; H04L 5/005; H04L 5/001; H04L 5/048; H04L 5/0051; H04L 5/0008; H04L 5/0007; H04L 5/0005
See application file for complete search history.

(56) References Cited

U.S. PATENT DOCUMENTS

| | | | |
|---|---|---|---|
| 2011/0235601 A1* | 9/2011 | Yoo | H04L 5/0073 370/329 |
| 2019/0141546 A1* | 5/2019 | Zhou | H04L 5/001 |
| 2019/0357262 A1* | 11/2019 | Cirik | H04L 5/001 |
| 2020/0053777 A1* | 2/2020 | Babaei | H04W 16/14 |
| 2020/0274679 A1* | 8/2020 | Futaki | H04W 24/08 |
| 2021/0068091 A1* | 3/2021 | Baek | H04W 76/23 |
| 2021/0167930 A1* | 6/2021 | Jeon | H04L 27/2607 |
| 2021/0226684 A1 | 7/2021 | Koskela et al. | |
| 2021/0227568 A1 | 7/2021 | Harada | |

(Continued)

FOREIGN PATENT DOCUMENTS

WO    WO-2019084449 A1 *    5/2019    ........... H04L 1/1812

OTHER PUBLICATIONS

International Search Report and Written Opinion—PCT/US2023/077548—ISA/EPO—Feb. 15, 2024.

(Continued)

*Primary Examiner* — Phong La
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration for common reference signal resources that are common across a first bandwidth part (BWP) and a second BWP within a component carrier. The UE may switch from the first BWP to the second BWP based at least in part on the configuration. The UE may transmit or measure, in the second BWP, reference signals that are in the common reference signal resources. Numerous other aspects are described.

30 Claims, 9 Drawing Sheets

(56) References Cited

U.S. PATENT DOCUMENTS

| | | | | |
|---|---|---|---|---|
| 2023/0216650 A1* | 7/2023 | Kwak | ................... | H04W 72/23 |
| | | | | 370/329 |
| 2023/0337075 A1* | 10/2023 | Zhang | ................... | H04W 36/08 |
| 2024/0163052 A1* | 5/2024 | Li | ....................... | H04B 7/0626 |
| 2024/0223332 A1* | 7/2024 | Elshafie | ............ | H04W 52/0229 |
| 2024/0340737 A1* | 10/2024 | Chen | ................. | H04W 36/0061 |
| 2024/0349213 A1* | 10/2024 | Chen | ................. | H04W 56/0015 |

OTHER PUBLICATIONS

Vivo: "Remaining Issues on Multi-Beam Transmission", 3GPP TSG RAN WG1 #99, R1-1912040, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 8, 2019, 10 pages, XP051819923, p. 3.

* cited by examiner

COMMON REFERENCE SIGNAL RESOURCES FOR BANDWIDTH PART SWITCHING

FIELD OF THE DISCLOSURE

Aspects of the present disclosure generally relate to wireless communication and to techniques and apparatuses for common reference signal resources for bandwidth part switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration for common reference signal resources that are common across a first bandwidth part (BWP) and a second BWP within a component carrier. The method may include switching from the first BWP to the second BWP based at least in part on the configuration. The method may include transmitting or measuring, in the second BWP, reference signals that are in the common reference signal resources.

Some aspects described herein relate to a method of wireless communication performed by a network entity. The method may include transmitting a configuration for common reference signal resources that are common across a first BWP and a second BWP within a component carrier. The method may include switching from a first BWP to a second BWP based at least in part on the configuration. The method may include transmitting or measuring, in the second BWP, reference signals that are among the common reference signal resources.

Some aspects described herein relate to a UE for wireless communication. The UE may include a memory and one or more processors coupled to the memory. The one or more processors may be configured to receive a configuration for common reference signal resources that are common across a first BWP and a second BWP within a component carrier. The one or more processors may be configured to switch from the first BWP to the second BWP based at least in part on the configuration. The one or more processors may be configured to transmit or measure, in the second BWP, reference signals that are in the common reference signal resources.

Some aspects described herein relate to a network entity for wireless communication. The network entity may include a memory and one or more processors coupled to the memory. The one or more processors may be configured to transmit a configuration for common reference signal resources that are common across a first BWP and a second BWP within a component carrier. The one or more processors may be configured to switch from a first BWP to a second BWP based at least in part on the configuration. The one or more processors may be configured to transmit or measure, in the second BWP, reference signals that are among the common reference signal resources.

Some aspects described herein relate to a non-transitory computer-readable medium that stores a set of instructions for wireless communication by a UE. The set of instructions, when executed by one or more processors of the UE, may cause the UE to receive a configuration for common reference signal resources that are common across a first BWP and a second BWP within a component carrier. The set of instructions, when executed by one or more processors of the UE, may cause the UE to switch from the first BWP to the second BWP based at least in part on the configuration. The set of instructions, when executed by one or more processors of the UE, may cause the UE to transmit or measure, in the second BWP, reference signals that are in the common reference signal resources.

Some aspects described herein relate to a non-transitory computer-readable medium that stores a set of instructions for wireless communication by a network entity. The set of instructions, when executed by one or more processors of the network entity, may cause the network entity to transmit a configuration for common reference signal resources that are common across a first BWP and a second BWP within a component carrier. The set of instructions, when executed by one or more processors of the network entity, may cause the network entity to switch from a first BWP to a second BWP based at least in part on the configuration. The set of instructions, when executed by one or more processors of the network entity, may cause the network entity to transmit or measure, in the second BWP, reference signals that are among the common reference signal resources.

Some aspects described herein relate to an apparatus for wireless communication. The apparatus may include means for receiving a configuration for common reference signal resources that are common across a first BWP and a second BWP within a component carrier. The apparatus may include means for switching from the first BWP to the second BWP based at least in part on the configuration. The apparatus may include means for transmitting or measuring, in the second BWP, reference signals that are in the common reference signal resources.

Some aspects described herein relate to an apparatus for wireless communication. The apparatus may include means for transmitting a configuration for common reference signal resources that are common across a first BWP and a second BWP within a component carrier. The apparatus may include means for switching from a first BWP to a second BWP based at least in part on the configuration. The apparatus may include means for transmitting or measuring, in the second BWP, reference signals that are among the common reference signal resources.

Aspects generally include a method, apparatus, system, computer program product, non-transitory computer-readable medium, UE, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
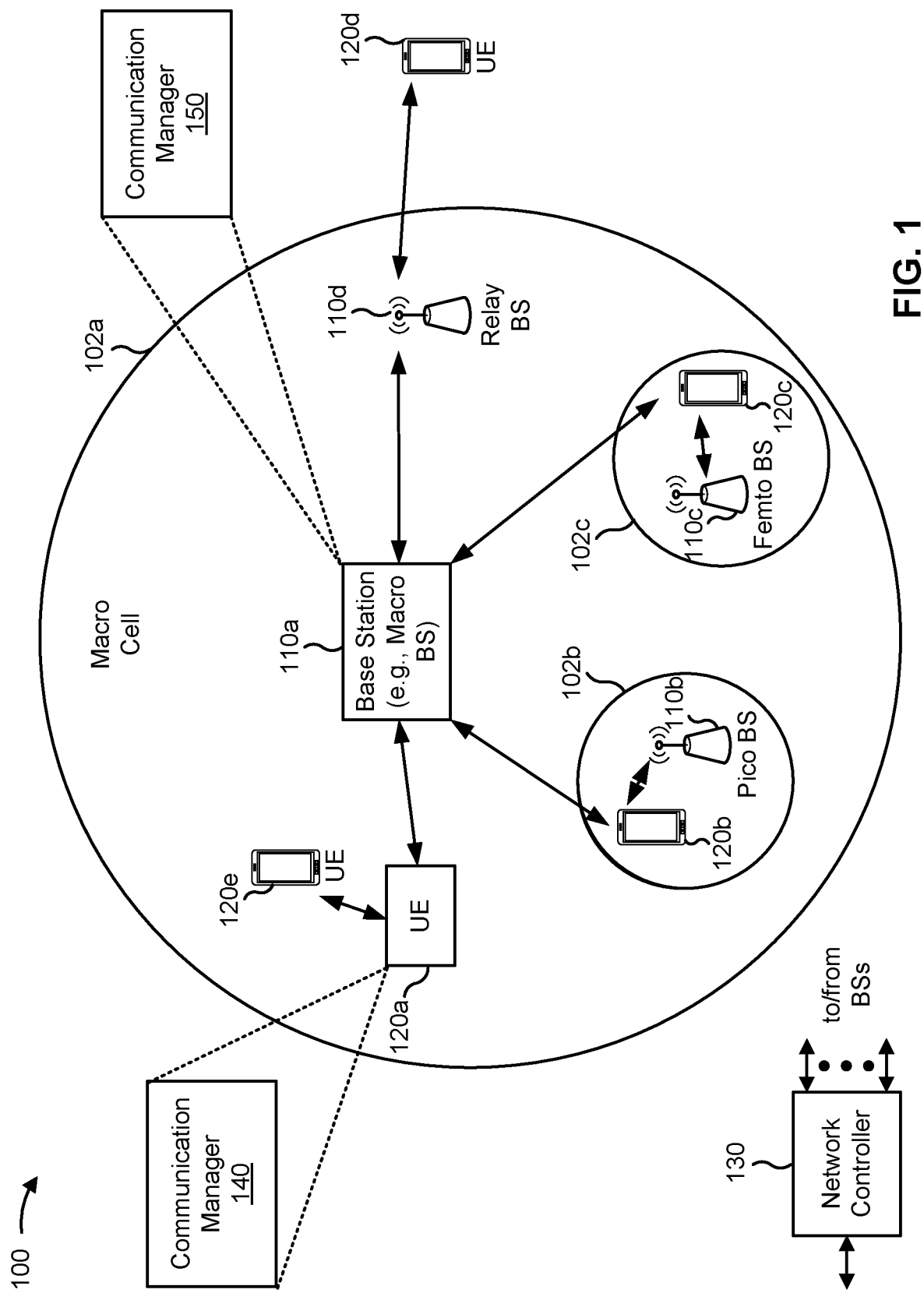
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120a, a UE 120b, a UE 120c, a UE 120d, and a UE 120e). The wireless network 100 may also include one or more network entities, such as base stations 110 (shown as a BS 110a, a BS 110b, a BS 110c, and a BS 110d), and/or other network entities. A base station 110 is a network entity that communicates with UEs 120. A base station 110 (sometimes referred to as a BS) may include, for example, an NR base station, an LTE base station, a NodeB, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the terms "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the terms "base station" or "network entity" may refer to one device configured to perform one or more functions, such as those described herein in connection with the base station 110. In some aspects, the terms "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the terms "base station" or "network entity" may refer to any one or more of those different devices. In some aspects, the terms "base station" or "network entity" may refer to one or more virtual base stations and/or one or more virtual base station functions. For example, in some aspects, two or more base station functions may be instantiated on a single device. In some aspects, the terms "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive a configuration for common reference signal resources that are common across a first bandwidth part (BWP) and a second BWP within a component carrier. The communication manager 140 may switch from the first BWP to the second BWP based at least in part on the configuration. The communication manager 140 may transmit or measure, in the second BWP, reference signals that are in the common reference signal resources. Additionally, or alternatively, the communication manager 140 may perform one or more other operations described herein.

In some aspects, a network entity (e.g., base station 110) may include a communication manager 150. As described in more detail elsewhere herein, the communication manager 150 may transmit a configuration for common reference signal resources that are common across a first BWP and a second BWP within a component carrier. The communication manager 150 may switch from a first BWP to a second BWP based at least in part on the configuration. The communication manager 150 may transmit or measure, in the second BWP, reference signals that are among the common reference signal resources. Additionally, or alternatively, the communication manager 150 may perform one or more other operations described herein.

As indicated above, FIG. 1 is provided as an example. Other examples may differ from what is described with regard to FIG. 1.

Figure 2:
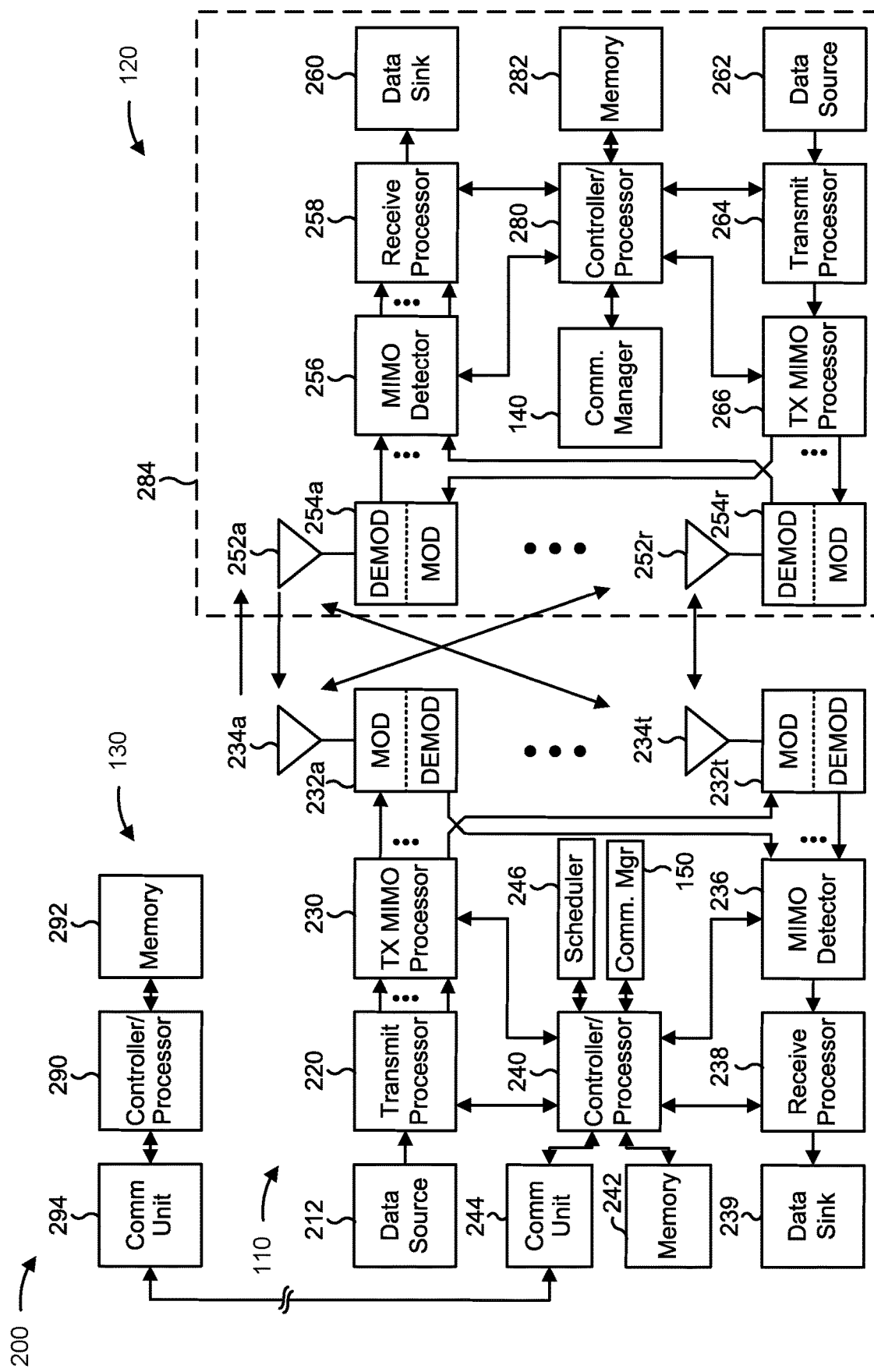
FIG. 2 is a diagram illustrating an example of a network entity (e.g., base station) in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM) and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

A controller/processor of a network entity (e.g., the controller/processor 240 of the base station 110), the controller/ processor 280 of the UE 120, and/or any other component(s) of FIG. 2 may perform one or more techniques associated with using common reference signal resources for BWP switching, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., UE 120) includes means for receiving a configuration for common reference signal resources that are common across a first BWP and a second BWP within a component carrier; means for switching from the first BWP to the second BWP based at least in part on the configuration; and/or means for transmitting or measuring, in the second BWP, reference signals that are in the common reference signal resources. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., base station 110) includes means for transmitting a configuration for common reference signal resources that are common across a first BWP and a second BWP within a component carrier; means for switching from a first BWP to a second BWP based at least in part on the configuration; and/or means for transmitting or measuring, in the second BWP, reference signals that are among the common reference signal resources. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
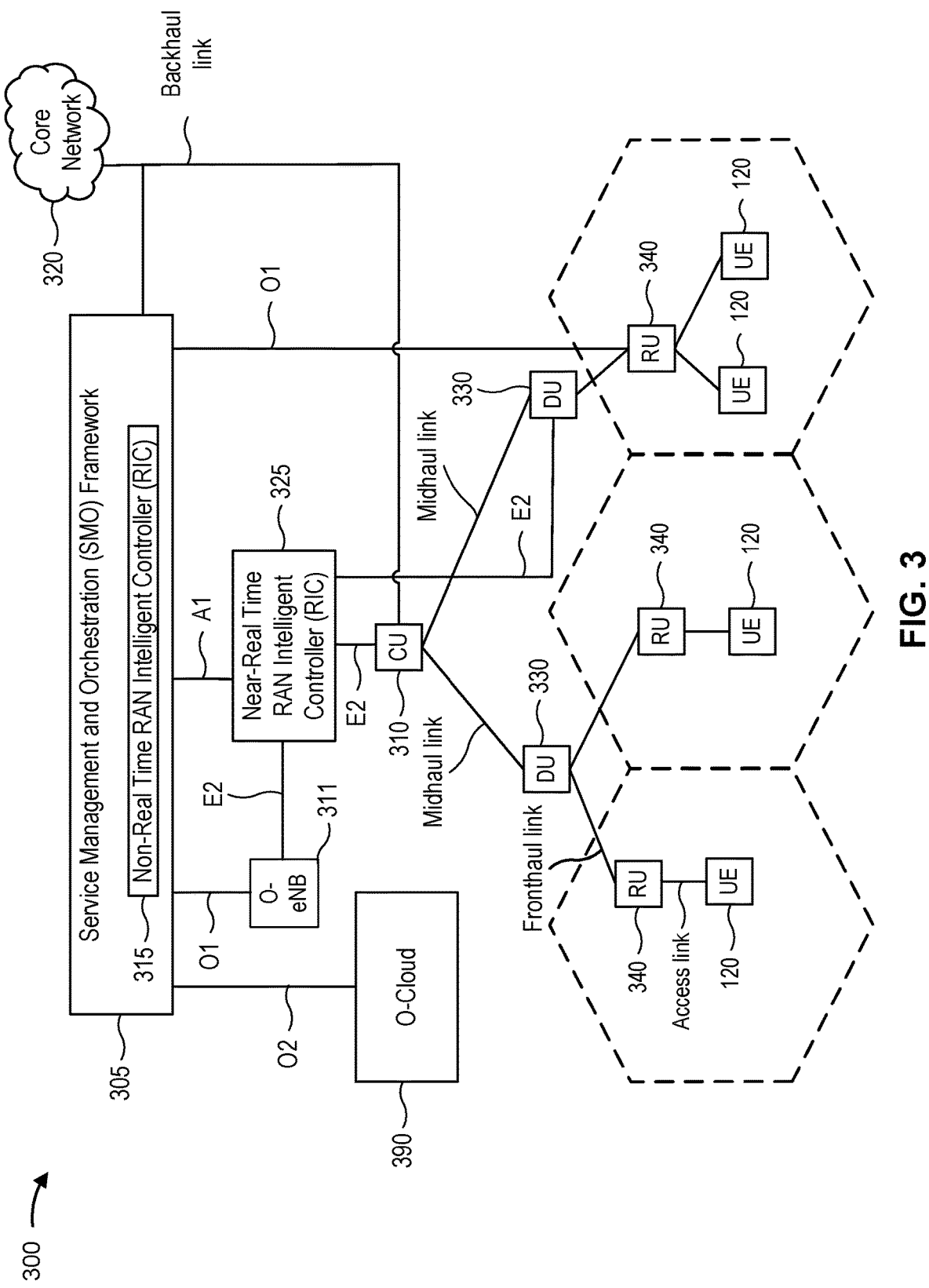
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUS (O-DUs") and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units (e.g., the CUS 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
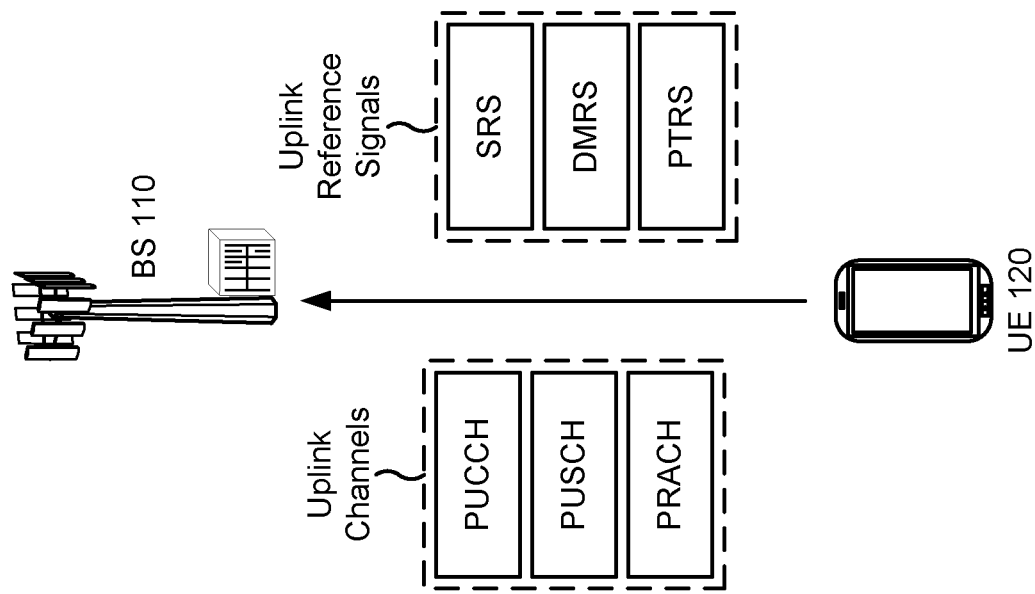
FIG. 4 is a diagram illustrating an example of physical channels and reference signals in a wireless network, in accordance with the present disclosure.
Figure 4:
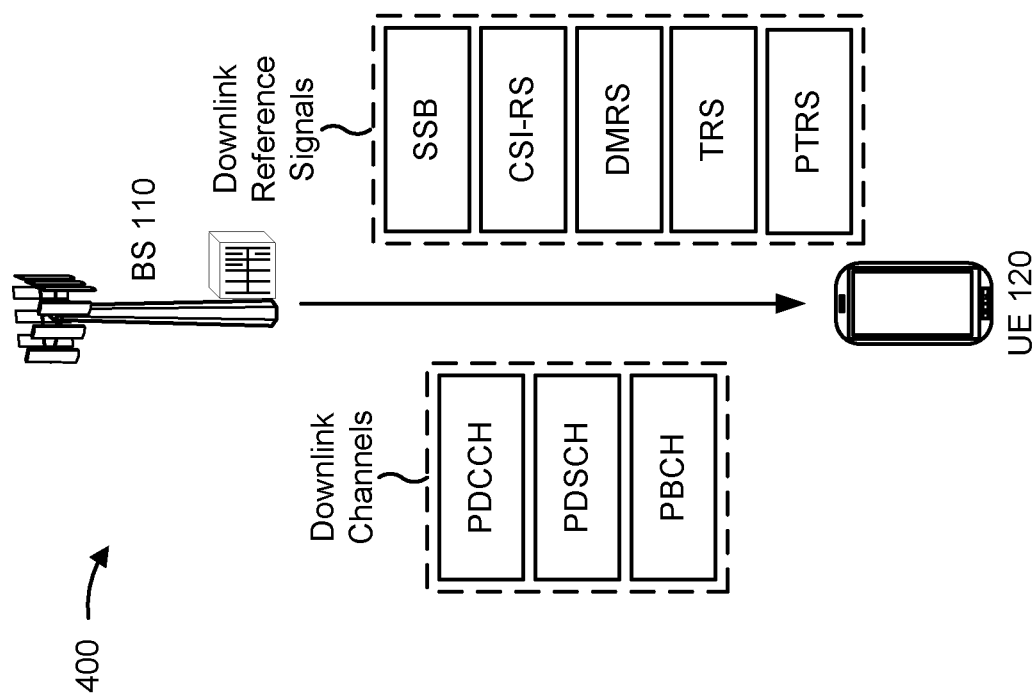

FIG. 4 is a diagram illustrating an example 400 of physical channels and reference signals in a wireless network, in accordance with the present disclosure. As shown in FIG. 4, downlink channels and downlink reference signals may carry information from a network entity (e.g., base station 110) to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), a tracking reference signal (TRS), or a phase TRS (PTRS) among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A TRS may be a reference signal that assists with time and frequency tracking, similar to a cell-specific reference signal (CRS) in LTE but with less overhead. The TRS may be a downlink transmission that allows the UE to track frequency and time variations with a high resolution. The purpose of a TRS may be served by a specific CSI-RS configuration. A TRS may be used to indicate that the antenna ports for CSI-RS resources in a CSI-RS resource set are the same.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

One way to dynamically change configuration parameters for reference signals is BWP switching. A first BWP may be associated with a particular configuration, which may include the quantity of CSI-RS ports, and a second BWP may have a different configuration with a different quantity of CSI-RS ports. If the base station 110 transmits an instruction for the UE 120 to switch from the first BWP to the second BWP, the UE 120 may also switch configurations. However, frequent BWP switching, with its signaling and multiple configurations, may consume processing resources and signaling resources. For example, due to bursty traffic conditions, the base station 110 may dynamically indicate that the UE 120 is to switch to another BWP and then, in a short amount of time, indicate that the UE 120 is to switch back to the original BWP.

The UE 120 may rely on an SSB and/or a TRS for automatic gain control (AGC) and time/frequency tracking loops. If a TRS is used, the UE 120 may be configured with a TRS transmit power via RRC signaling. With respect to network energy savings, two techniques may impact the TRS transmit power. A first technique may include dynamic antenna port adaptation, where the quantity of antenna ports for CSI-RSs may be dynamically updated so that some ports can be switched off for network energy savings. This may dynamically change the CSI-RS transmit power. A second technique may include dynamic transmit power adaptation, where the transmit power for CSI-RSs may be dynamically updated so that power amplifiers work in a more power efficient mode. The dynamic update of the CSI-RS transmit power may be dynamically indicated to connected mode UEs. In 3GPP standards Release 15 and Release 16, idle/inactive mode UEs operate AGC and time/frequency tracking loops based on SSBs. In Release 17, UEs may be configured with CSI-RSs for AGC and time/frequency tracking loops.

A UE may be in a connected mode (e.g., RRC connected) or an idle mode (or inactive mode). CSI-RS occasions for connected mode UEs can be shared with idle/inactive mode UEs for functionalities such as AGC and time/frequency tracking. Periodic CSI-RS configurations may also be supported for idle and inactive mode UEs. A CSI-RS configuration may not include TRS information, and the use of CSI-RSs for idle/inactive mode UEs is not limited to TRSs. A system information block (SIB) may indicate a configuration for TRS occasions. Then, either paging DCI or a paging early indication (PEI) may further indicate TRS occasion availability. However, there remain inefficiencies in the use of CSI-RSs, TRSs, and SRSs for time/frequency tracking that consume power, processing resources, and signaling resources.

As indicated above, FIG. 4 is provided as an example. Other examples may differ from what is described with regard to FIG. 4.

According to various aspects described herein, a UE may use reference signal resources (e.g., CSI-RSs, TRSs, SRSs) that are common across BWPs within a component carrier. The UE may receive a configuration for the common reference signal resources and use the configuration for the common reference signal resources when switching between BWPs. By using reference signal resources that are common across BWPs, the UE may reduce the amount of configuration that is involved. For example, the UE does not need have separate configurations for CSI-RSs, TRSs, and SRSs for time/frequency tracking when using different BWPs. As a result, the UE and a corresponding network entity reduce the configurations involved and thus conserve processing resources and signaling resources.

Figure 5:
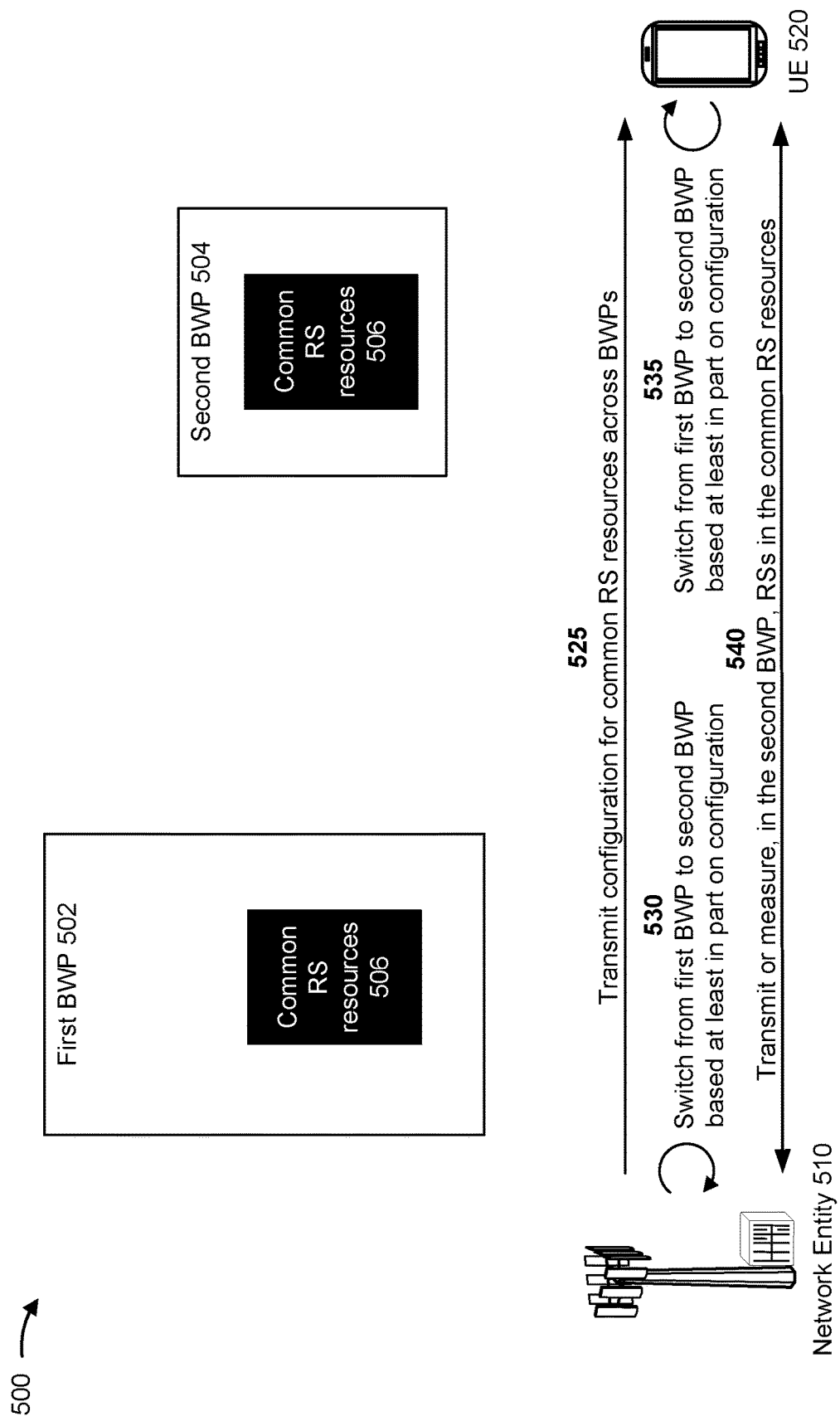
FIG. 5 is a diagram illustrating an example of using common reference signal resources that are common across bandwidth parts, in accordance with the present disclosure.

FIG. 5 is a diagram illustrating an example 500 of using common reference signal resources that are common across BWPs, in accordance with the present disclosure. Example 500 shows a network entity 510 (e.g., base station 110) and a UE 520 (e.g., UE 120) that may communicate with each other via a wireless network (e.g., wireless network 100).

The network entity 510 may indicate that the UE 520 is to switch from a first BWP 502 to a second BWP 504. The first BWP 502 and the second BWP 504 may be in the same component carrier. In some aspects, the network entity 510 may configure the UE 520 with common reference signal (RS) resources 506 that are common across the first BWP 502, the second BWP 504, and possibly other BWPs. Example 500 shows the use of the common reference signal resources 506. As shown by reference number 525, the network entity 510 may transmit a configuration for the common reference signal resources 506 that are common across BWPs. The configuration may indicate the second BWP 504. The common reference signal resources 506 may include resources for SRSs, CSI-RSs, and/or TRSs that are used for time/frequency tracking and channel sounding. The common reference signal resources 506 may include a resource set. The common reference signal resources 506 may be periodic resources.

As shown by reference number 530, the network entity 510 may switch from the first BWP 502 to the second BWP 504. When the UE 520 switches to the second BWP 504, the UE 520 may use the common reference signal resources 506 for measurements. In some aspects, the first BWP 502 or the second BWP 504 may be associated with a power saving mode. The configuration may be for a power saving mode and may be different than a main radio configuration that is not for the power saving mode. Similarly, the common reference signal resources 506 may be associated with a power saving mode.

In some aspects, the first BWP 502 may be larger than the second BWP 504, and the common reference signal resources 506 may be adjusted for the first BWP 502 based at least in part on the second BWP 504 and based at least in part on the configuration and/or an indication of a pattern or procedure to be used within the first BWP 502. The second BWP 504 may be a default BWP.

As shown by reference number 535, the UE 520 may also switch from the first BWP 502 to the second BWP 504. The UE 520 may switch based at least in part on an indication from the network entity 510 or a BWP switching rule. The indication may be included in DCI. The DCI may indicate how the common reference signal resources 506 are to be used in association with a power saving mode. The DCI may indicate which BWPs are to be used with the common reference signal resources 506.

By using common reference signal resources across BWPs, the network entity 510 and the UE 520 may reduce the configuration involved for multiple BWPs. As a result of less configuration, the network entity 510 and the UE 520 conserves power, processing resources, and signaling resources. The use of common reference signal resources across BWPs may also help the network entity 510 when the network entity 510 is moving from one power saving mode to another. When power saving modes are associated with a certain BWPs or BWP reductions, less configuration is involved and thus fewer signaling resources are used.

One or more configurations may be associated with one or more low power modes at the UE 520. For example, when the UE 520 has sufficient power, the UE 520 may use a configuration that is different than a configuration used by a passive IoT or zero power device. The common reference signal resources 506 may be associated with a common CSI report configuration, which may include a set of resources and a certain report type. In some aspects, a configuration signaled via an RRC message or a medium access control control element (MAC CE) may be used across a group of BWPs or all BWPs. The use of the common reference signal resources 506 may reduce the amount of configuration that is involved with a plurality of BWPs. In some aspects, the UE 520 may receive the configuration while in an idle mode (e.g., RRC idle mode or inactive state).

In some aspects, the allocation of the common reference signal resources 506 may be based at least in part on a smaller BWP (e.g., the second BWP 504) such that the common reference signal resources 506 are valid within a bigger BWP (e.g., the first BWP 502). In some aspects, the common reference signal resources 506 may be based at least in part on the bigger BWP and then some preconfigured or defined pattern procedure may be used for smaller BWPs (e.g., as specified in stored configuration information or as received in an RRC message, a MAC CE, or DCI).

In some aspects, the network entity 510 may transmit an update (e.g., via an RRC message or a MAC CE) that indicates the common reference signal resources 506, which BWPs conserve energy, for which BWPs the update applies, one or more power saving modes, and/or for which power saving modes the update applies.

In some aspects, the indication may indicate a switching time. The switching time may be a duration or an amount of time during which the UE 520 is to use the second BWP 504 before switching back to the first BWP 502. The UE 520 may use a first timer for the switching time. The first timer may start when the UE 520 switches to the second BWP 504 from the first BWP 502. The first timer may stop when the switching time is to end. When the switching time ends (and the first timer stops), the UE 520 may switch back to the first BWP 502.

In some aspects, the UE 520 may switch to a low power BWP that is within the second BWP 504. The UE 520 may receive an indication to switch to the low power BWP. The UE 520 may operate a second timer when switching to a low power BWP within the second BWP 504. The second timer may start when the UE 520 enters the low power BWP and stop when the UE 520 is to exit the low power BWP. That is, the second timer may run during at least a portion of the first timer (during the switching time). When the second timer stops, the UE 520 may exit the low power BWP. The second timer may be based at least in part on the first timer. For example, the second timer may start and stop within the switching time (while the first timer is running).

In some aspects, the UE 520 may switch to a first low power BWP within the first BWP 502. The UE 520 may operate a second timer (different in this scenario for the first BWP 502 than for the scenario above with the second BWP 504) when switching to a first low power BWP within the first BWP 502. The second timer may start when the UE 520 enters the first low power BWP and may stop when the UE 520 is to exit the first low power BWP. When the second timer stops, the UE 520 may exit the first low power BWP. The second timer may be based at least in part on a first timer (for the switching time to the second BWP 504). For example, the second timer (for the first low power BWP within the first BWP 502) may stop before the first timer starts (when the UE 520 switches to the second BWP 504). If the UE 520 uses the second timer for the first low power BWP (within the first BWP 502), the UE 520 may use a third timer when the UE 520 switches to a second low power BWP within the second BWP 504. The third timer may start when the UE 520 enters the second low power BWP (within the second BWP 504) and may stop when the UE 520 is to exit the second low power BWP. When the third timer stops, the UE 520 may exit the second low power BWP. The third timer may run during at least a portion of the first timer. The UE 520 may switch to the second BWP 504 based at least in part on a power saving configuration identifier (ID).

As shown by reference number 540, the network entity 510 and/or the UE 520 may transmit or measure reference signals in the second BWP. The reference signals may be from among the common reference signal resources 506.

In some aspects, the network entity 510 may transmit a message (e.g., via a MAC CE, DCI, or other dynamic signaling) that indicates that some resources are to be common across BWPs for a period of time independent of any BWP switching. In some aspects, DCI may include two bits that map to an RRC configured table that indicates whether specific CSI-RS resources, SRS resources, or resources under a certain report configuration are common resources and are valid with any BWP switch or power saving mode. For example, "00" may indicate a common resource to be used for X1 milliseconds, "01" may indicate a common resource to be used for X2 milliseconds, "10" may indicate a common resource to be used for X3 milliseconds, and "11" may indicate a common resource to be used for X4 milliseconds.

In some aspects, the configuration may indicate a first set of parameters for a first energy saving mode and a second set of parameters for a second energy saving mode. The configuration may indicate different parameters within the first set of parameters than included in the second set of parameters. Additionally, or alternatively, the configuration may indicate separate, distinct, or different values of a same parameter(s) in both the first set of parameters and second set of parameters. Such parameters may include, for example, different bandwidths for the common resources, different repetition factors, different periodicities, a different quantity of symbols, or a different quantity of ports (e.g., deactivate or activate certain ports). The UE 520 may receive an update for one or more of the parameters.

In some aspects, the network entity 510 may broadcast a TRS configuration for different BWPs in a SIB-17 (for idle mode UEs). This may be applicable to a scenario when the UE 520 switches from an idle mode to an RRC connected mode (the RRC configuration may not necessarily include the TRS configuration).

While various aspects are applicable to FR1, for FR2, the network entity 510 may transmit information per SSB area or at least for a subset of SSB areas that are configured in the cell.

As indicated above, FIG. 5 is provided as an example. Other examples may differ from what is described with respect to FIG. 5.

Figure 6:
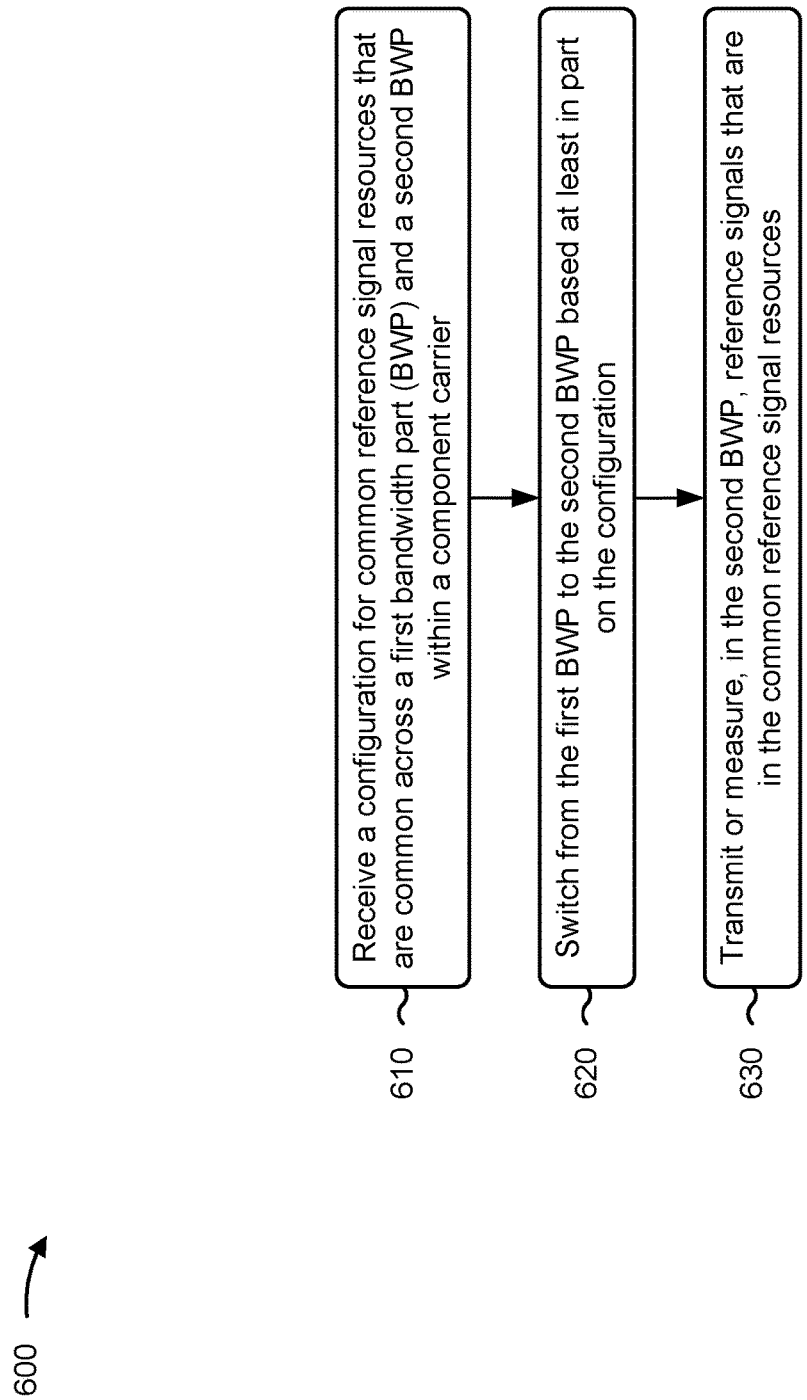
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120, UE 520) performs operations associated with common reference signal resources across BWPs.

As shown in FIG. 6, in some aspects, process 600 may include receiving a configuration for common reference signal resources that are common across a first BWP and a second BWP within a component carrier (block 610). For example, the UE (e.g., using communication manager 808 and/or reception component 802 depicted in FIG. 8) may receive a configuration for common reference signal resources that are common across a first BWP and a second BWP within a component carrier, as described above.

As further shown in FIG. 6, in some aspects, process 600 may include switching from the first BWP to the second BWP based at least in part on the configuration (block 620). For example, the UE (e.g., using communication manager 808 and/or switching component 810 depicted in FIG. 8) may switch from the first BWP to the second BWP based at least in part on the configuration, as described above.

As further shown in FIG. 6, in some aspects, process 600 may include transmitting or measuring, in the second BWP, reference signals that are in the common reference signal resources (block 630). For example, the UE (e.g., using communication manager 808 and/or transmission component 804 depicted in FIG. 8) may transmit or measure, in the second BWP, reference signals that are in the common reference signal resources, as described above.

Process 600 may include additional aspects, such as any single aspect or any combination of aspects described below and/or in connection with one or more other processes described elsewhere herein.

In a first aspect, the common reference signal resources are associated with a power saving mode.

In a second aspect, alone or in combination with the first aspect, the configuration is different than a main radio configuration that is not for the power saving mode.

In a third aspect, alone or in combination with one or more of the first and second aspects, the first BWP or the second BWP is associated with a power saving mode.

In a fourth aspect, alone or in combination with one or more of the first through third aspects, the first BWP is larger than the second BWP, and the common reference signal resources are adjusted for the first BWP based at least in part on the second BWP and one or more of the configuration or an indication of a pattern or procedure to be used within the first BWP.

In a fifth aspect, alone or in combination with one or more of the first through fourth aspects, the configuration indicates a first set of parameters for a first energy saving mode and a second set of parameters for a second energy saving mode.

In a sixth aspect, alone or in combination with one or more of the first through fifth aspects, process 600 includes receiving an update of parameters for the configuration.

In a seventh aspect, alone or in combination with one or more of the first through sixth aspects, the update indicates for which BWPs or power saving modes the update applies.

In an eighth aspect, alone or in combination with one or more of the first through seventh aspects, receiving the configuration includes receiving the configuration in a MAC CE or DCI.

In a ninth aspect, alone or in combination with one or more of the first through eighth aspects, receiving the configuration includes receiving the configuration in a SIB while the UE is in an idle mode.

In a tenth aspect, alone or in combination with one or more of the first through ninth aspects, the configuration indicates one or more reference signal resources that are to be among the common reference signal resources.

In an eleventh aspect, alone or in combination with one or more of the first through tenth aspects, switching to the second BWP includes switching to the second BWP based at least in part on receiving an indication to switch to the second BWP.

In a twelfth aspect, alone or in combination with one or more of the first through eleventh aspects, receiving the indication includes receiving the indication in DCI.

In a thirteenth aspect, alone or in combination with one or more of the first through twelfth aspects, the DCI indicates how the common reference signal resources are to be used in association with a power saving mode.

In a fourteenth aspect, alone or in combination with one or more of the first through thirteenth aspects, the DCI indicates which BWPs are to be used with the common reference signal resources.

In a fifteenth aspect, alone or in combination with one or more of the first through fourteenth aspects, the configuration indicates a switching time for how long the UE is to use the second BWP before switching back to the first BWP.

In a sixteenth aspect, alone or in combination with one or more of the first through fifteenth aspects, process 600 includes operating a first timer that determines when the switching time begins and ends, and switching to a low power BWP within the second BWP based at least in part on a second timer that determines when the low power BWP begins and ends, and the second timer starts and stops while the first timer is running.

In a seventeenth aspect, alone or in combination with one or more of the first through sixteenth aspects, switching to the low power BWP includes switching to the low power BWP during the switching time based at least in part on receiving an indication to switch to the low power BWP.

In an eighteenth aspect, alone or in combination with one or more of the first through seventeenth aspects, process 600 includes switching to a first low power BWP within the first BWP before a first timer starts, where the first timer determines when the switching time begins and ends and where a second timer determines when the first low power BWP begins and ends, and switching to a second low power BWP within the second BWP based at least in part on a third timer that determines when the second low power BWP begins and ends, where the third timer starts and stops while the first timer is running.

In a nineteenth aspect, alone or in combination with one or more of the first through eighteenth aspects, switching to the second BWP includes switching to the second BWP based at least in part on a power saving configuration identifier.

In a twentieth aspect, alone or in combination with one or more of the first through nineteenth aspects, the second BWP is a default BWP.

In a twenty-first aspect, alone or in combination with one or more of the first through twentieth aspects, the configuration indicates the second BWP.

In a twenty-second aspect, alone or in combination with one or more of the first through twenty-first aspects, the common reference signal resources are periodic resources.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
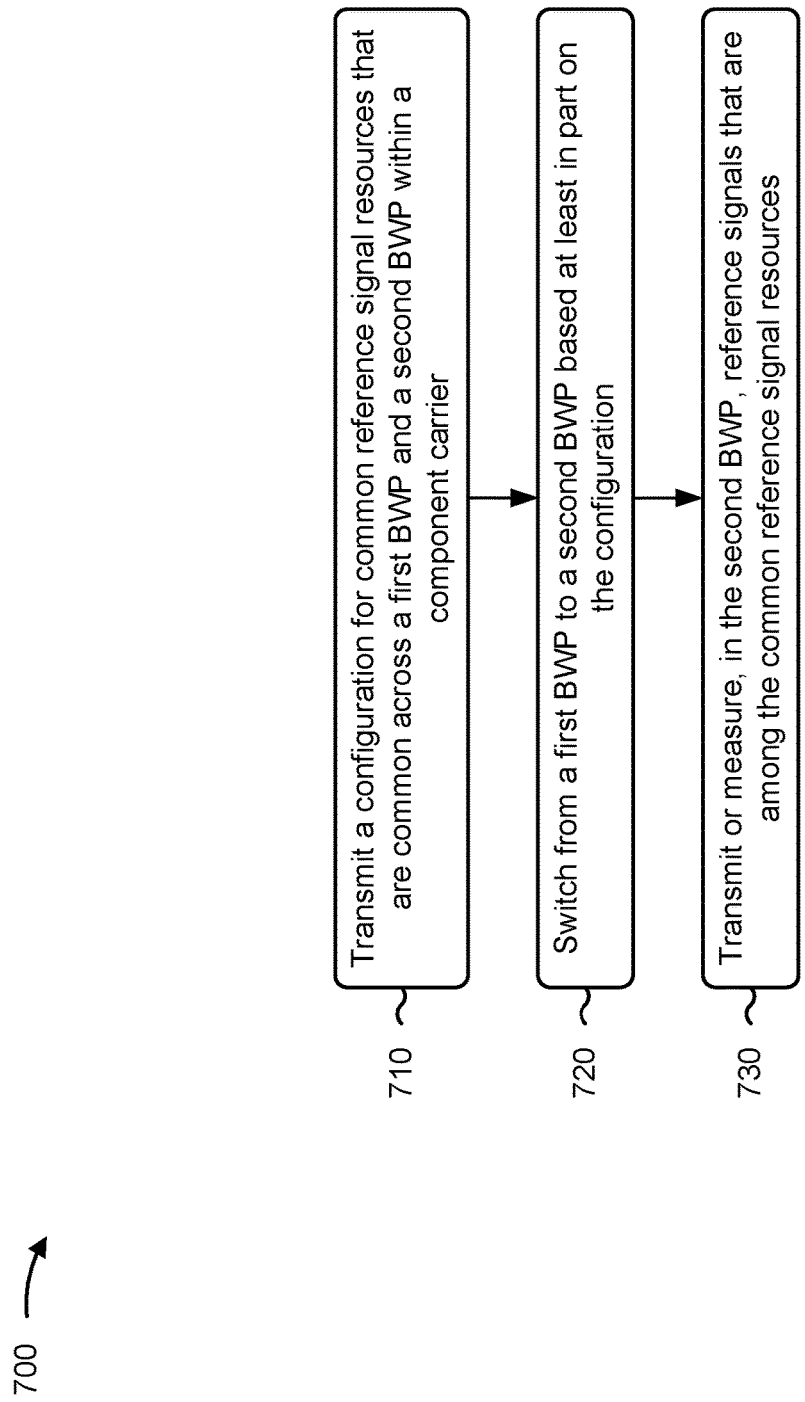
FIG. 7 is a diagram illustrating an example process performed, for example, by a network entity, in accordance with the present disclosure.

FIG. 7 is a diagram illustrating an example process 700 performed, for example, by a network entity, in accordance with the present disclosure. Example process 700 is an example where the network entity (e.g., base station 110, network entity 510) performs operations associated with common reference signal resources across BWPs As shown in FIG. 7, in some aspects, process 700 may include transmitting a configuration for common reference signal resources that are common across a first BWP and a second BWP within a component carrier (block 710). For example, the network entity (e.g., using communication manager 908 and/or transmission component 904 depicted in FIG. 9) may transmit a configuration for common reference signal resources that are common across a first BWP and a second BWP within a component carrier, as described above.

As further shown in FIG. 7, in some aspects, process 700 may include switching from a first BWP to a second BWP based at least in part on the configuration (block 720). For example, the network entity (e.g., using communication manager 908 and/or switching component 910 depicted in FIG. 9) may switch from a first BWP to a second BWP based at least in part on the configuration, as described above.

As further shown in FIG. 7, in some aspects, process 700 may include transmitting or measuring, in the second BWP, reference signals that are among the common reference signal resources (block 730). For example, the network entity (e.g., using communication manager 908 and/or transmission component 904 depicted in FIG. 9) may transmit or measure, in the second BWP, reference signals that are among the common reference signal resources, as described above.

Process 700 may include additional aspects, such as any single aspect or any combination of aspects described below and/or in connection with one or more other processes described elsewhere herein.

In a first aspect, the common reference signal resources are associated with a power saving mode.

In a second aspect, alone or in combination with the first aspect, the first BWP or the second BWP is associated with a power saving mode.

In a third aspect, alone or in combination with one or more of the first and second aspects, process 700 includes transmitting an update of parameters for the configuration, where the update indicates for which BWPs or power saving modes the update applies.

In a fourth aspect, alone or in combination with one or more of the first through third aspects, transmitting the configuration includes transmitting the configuration in a SIB while in a UE is in an idle mode.

In a fifth aspect, alone or in combination with one or more of the first through fourth aspects, process 700 includes transmitting DCI that indicates how the common reference signal resources are to be used in association with a power saving mode.

In a sixth aspect, alone or in combination with one or more of the first through fifth aspects, process 700 includes transmitting DCI that indicates which BWPs are to be used with the common reference signal resources.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
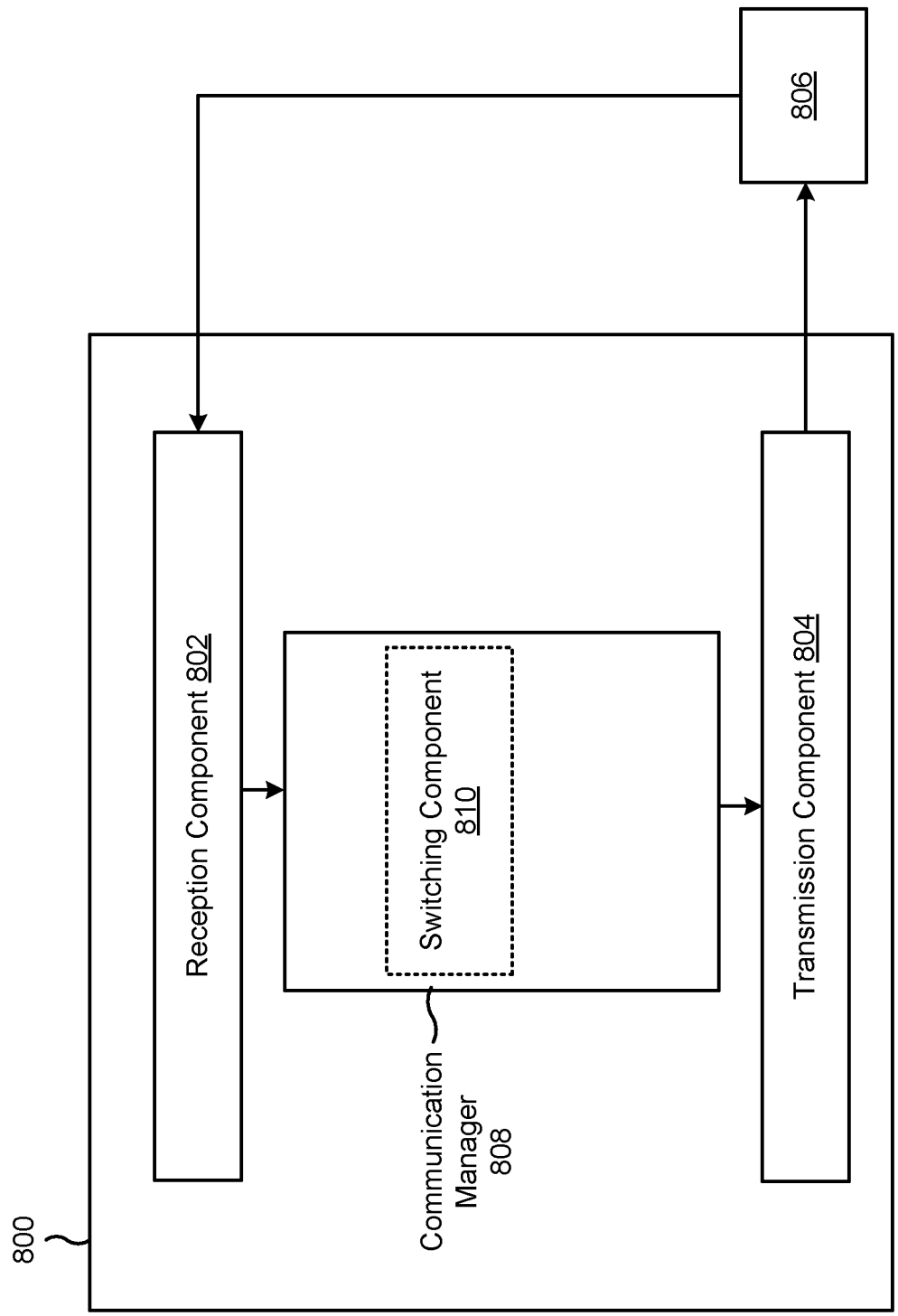
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE (e.g., UE 120, UE 520), or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 808. The communication manager 808 may control and/or otherwise manage one or more operations of the reception component 802 and/or the transmission component 804. In some aspects, the communication manager 808 may include one or more antennas, a modem, a controller/processor, a memory, or a combination thereof, of the UE described in connection with FIG. 2. The communication manager 808 may be, or be similar to, the communication manager 140 depicted in FIGS. 1 and 2. For example, in some aspects, the communication manager 808 may be configured to perform one or more of the functions described as being performed by the communication manager 140. In some aspects, the communication manager 808 may include the reception component 802 and/or the transmission component 804. The communication manager 140 may include a switching component 810, among other examples.

In some aspects, the apparatus 800 may be configured to perform one or more operations described herein in connection with FIGS. 1-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive a configuration for common reference signal resources that are common across a first BWP and a second BWP within a component carrier. The switching component 810 may switch from the first BWP to the second BWP based at least in part on the configuration. The transmission component 804 may transmit or measure, in the second BWP, reference signals that are in the common reference signal resources. The reception component 802 may receive an update of parameters for the configuration.

The switching component 810 may operate a first timer based at least in part on the switching time and switch to a low power BWP within the second BWP based at least in part on a second timer. The switching component 810 may switch to a first low power BWP within the first BWP based at least in part on a first timer, where a second timer is based at least in part on the switching time. The switching component 810 may switch to a second low power BWP within the second BWP based at least in part on a third timer.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
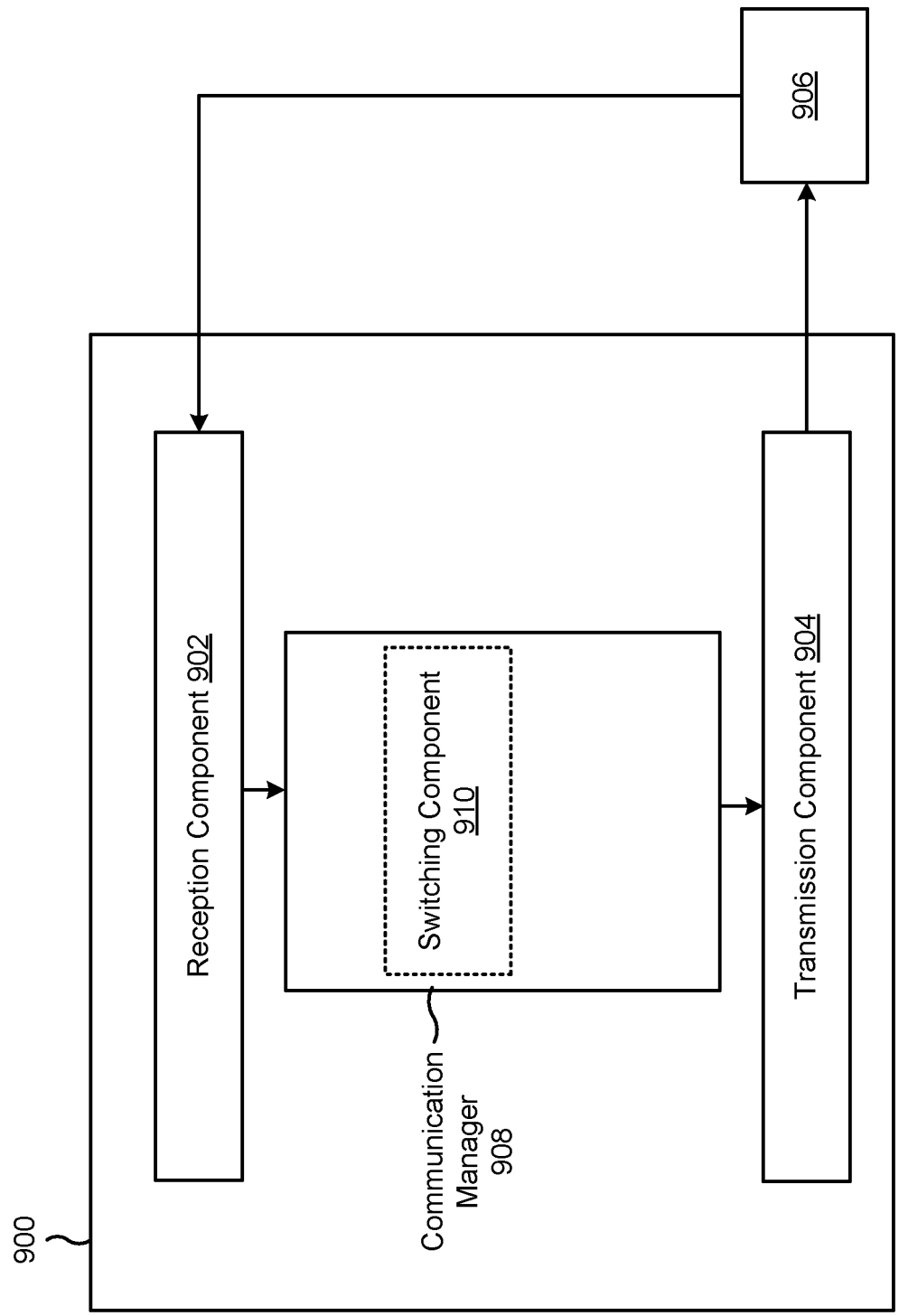
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network entity (e.g., base station 110, network entity 510), or a network entity may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908. The communication manager 908 may control and/or otherwise manage one or more operations of the reception component 902 and/or the transmission component 904. In some aspects, the communication manager 908 may include one or more antennas, a modem, a controller/processor, a memory, or a combination thereof, of the network entity described in connection with FIG. 2. The communication manager 908 may be, or be similar to, the communication manager 150 depicted in FIGS. 1 and 2. For example, in some aspects, the communication manager 908 may be configured to perform one or more of the functions described as being performed by the communication manager 150. In some aspects, the communication manager 908 may include the reception component 902 and/or the transmission component 904. The communication manager 908 may include a switching component 910, among other examples.

In some aspects, the apparatus 900 may be configured to perform one or more operations described herein in connection with FIGS. 1-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network entity described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network entity described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network entity described in connection with FIG. 2. In some aspects, the transmission component 904 may be co-located with the reception component 902 in a transceiver.

The transmission component 904 may transmit a configuration for common reference signal resources that are common across a first BWP and a second BWP within a component carrier. The switching component 910 may switch from a first BWP to a second BWP based at least in part on the configuration. The transmission component 904 may transmit or measure, in the second BWP, reference signals that are among the common reference signal resources.

The transmission component 904 may transmit an update of parameters for the configuration, where the update indicates for which BWPs or power saving modes the update applies. The transmission component 904 may transmit DCI that indicates how the common reference signal resources are to be used in association with a power saving mode. The transmission component 904 may transmit DCI that indicates which BWPs are to be used with the common reference signal resources.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a configuration for common reference signal resources that are common across a first bandwidth part (BWP) and a second BWP within a component carrier; switching from the first BWP to the second BWP based at least in part on the configuration; and transmitting or measuring, in the second BWP, reference signals that are in the common reference signal resources.

Aspect 2: The method of Aspect 1, wherein the common reference signal resources are associated with a power saving mode.

Aspect 3: The method of Aspect 2, wherein the configuration is different than a main radio configuration that is not for the power saving mode.

Aspect 4: The method of any of Aspects 1-3, wherein the first BWP or the second BWP is associated with a power saving mode.

Aspect 5: The method of any of Aspects 1-4, wherein the first BWP is larger than the second BWP, and wherein the common reference signal resources are adjusted for the first BWP based at least in part on the second BWP and one or more of the configuration or an indication of a pattern or procedure to be used within the first BWP.

Aspect 6: The method of any of Aspects 1-5, wherein the configuration indicates a first set of parameters for a first energy saving mode and a second set of parameters for a second energy saving mode.

Aspect 7: The method of any of Aspects 1-6, further comprising receiving an update of parameters for the configuration.

Aspect 8: The method of Aspect 7, wherein the update indicates for which BWPs or power saving modes the update applies.

Aspect 9: The method of any of Aspects 1-8, wherein receiving the configuration includes receiving the configuration in a medium access control control element (MAC CE) or downlink control information.

Aspect 10: The method of any of Aspects 1-9, wherein receiving the configuration includes receiving the configuration in a system information block while the UE is in an idle mode.

Aspect 11: The method of any of Aspects 1-10, wherein the configuration indicates one or more reference signal resources that are to be among the common reference signal resources.

Aspect 12: The method of any of Aspects 1-11, wherein switching to the second BWP includes switching to the second BWP based at least in part on receiving an indication to switch to the second BWP.

Aspect 13: The method of Aspect 12, wherein receiving the indication includes receiving the indication in downlink control information (DCI).

Aspect 14: The method of Aspect 13, wherein the DCI indicates how the common reference signal resources are to be used in association with a power saving mode.

Aspect 15: The method of Aspect 13, wherein the DCI indicates which BWPs are to be used with the common reference signal resources.

Aspect 16: The method of any of Aspects 1-15, wherein the configuration indicates a switching time for how long the UE is to use the second BWP before switching back to the first BWP.

Aspect 17: The method of Aspect 16, further comprising operating a first timer that determines when the switching time begins and ends, and switching to a low power BWP within the second BWP based at least in part on a second timer that determines when the low power BWP begins and ends, and the second timer starts and stops while the first timer is running.

Aspect 18: The method of Aspect 17, wherein switching to the low power BWP includes switching to the low power BWP during the switching time based at least in part on receiving an indication to switch to the low power BWP.

Aspect 19: The method of Aspect 16, further comprising: switching to a first low power BWP within the first BWP before a first timer starts, wherein the first timer determines when the switching time begins and ends, and wherein a second timer determines when the first low power BWP begins and ends; and switching to a second low power BWP within the second BWP based at least in part on a third timer that determines when the second low power BWP begins and ends, wherein the third timer starts and stops while the first timer is running.

Aspect 20: The method of any of Aspects 1-19, wherein switching to the second BWP includes switching to the second BWP based at least in part on a power saving configuration identifier.

Aspect 21: The method of any of Aspects 1-20, wherein the second BWP is a default BWP.

Aspect 22: The method of any of Aspects 1-21, wherein the configuration indicates the second BWP.

Aspect 23: The method of any of Aspects 1-22, wherein the common reference signal resources are periodic resources.

Aspect 24: A method of wireless communication performed by a network entity, comprising: transmitting a configuration for common reference signal resources that are common across a first bandwidth part (BWP) and a second BWP within a component carrier; switching from a first BWP to a second BWP based at least in part on the configuration; and transmitting or measuring, in the second BWP, reference signals that are among the common reference signal resources.

Aspect 25: The method of Aspect 24, wherein the common reference signal resources are associated with a power saving mode.

Aspect 26: The method of any of Aspects 24-25, wherein the first BWP or the second BWP is associated with a power saving mode.

Aspect 27: The method of any of Aspects 24-26, further comprising transmitting an update of parameters for the configuration, wherein the update indicates for which BWPs or power saving modes the update applies.

Aspect 28: The method of any of Aspects 24-27, wherein transmitting the configuration includes transmitting the configuration in a system information block while in a user equipment is in an idle mode.

Aspect 29: The method of any of Aspects 24-28, further comprising transmitting downlink control information that indicates how the common reference signal resources are to be used in association with a power saving mode.

Aspect 30: The method of any of Aspects 24-29, further comprising transmitting downlink control information that indicates which BWPs are to be used with the common reference signal resources.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive a configuration for common reference signal resources that are common across a first bandwidth part (BWP) and a second BWP within a component carrier,
         wherein the first BWP is larger than the second BWP, and
         wherein the common reference signal resources are adjusted for the first BWP based at least in part on the second BWP and one or more of the configuration or an indication of a pattern or procedure to be used within the first BWP;
      switch from the first BWP to the second BWP based at least in part on the configuration; and
      transmit or measure, in the second BWP, reference signals that are in the common reference signal resources.

2. The UE of claim 1, wherein the common reference signal resources are associated with a power saving mode.

3. The UE of claim 2, wherein the configuration is different than a main radio configuration that is not for the power saving mode.

4. The UE of claim 1, wherein the first BWP or the second BWP is associated with a power saving mode.

5. The UE of claim 1, wherein the configuration indicates a first set of parameters for a first energy saving mode and a second set of parameters for a second energy saving mode.

6. The UE of claim 1, wherein the one or more processors are configured to receive an update of parameters for the configuration.

7. The UE of claim 6, wherein the update indicates for which BWPs or power saving modes the update applies.

8. The UE of claim 1, wherein the one or more processors, to receive the configuration, are configured to receive the configuration in a medium access control control element (MAC CE) or downlink control information.

9. The UE of claim 1, wherein the one or more processors, to receive the configuration, are configured to receive the configuration in a system information block while the UE is in an idle mode.

10. The UE of claim 1, wherein the configuration indicates one or more reference signal resources that are to be among the common reference signal resources.

11. The UE of claim 1, wherein the one or more processors, to switch to the second BWP, are configured to:
receive an indication to switch to the second BWP; and
switch to the second BWP based at least in part on the indication.

12. The UE of claim 11, wherein the one or more processors, to receive the indication, are configured to receive the indication in downlink control information (DCI).

13. The UE of claim 12, wherein the DCI indicates how the common reference signal resources are to be used in association with a power saving mode.

14. The UE of claim 12, wherein the DCI indicates which BWPs are to be used with the common reference signal resources.

15. The UE of claim 1, wherein the configuration indicates a switching time for how long the UE is to use the second BWP before switching back to the first BWP.

16. The UE of claim 15, wherein the one or more processors are further configured to:
operate a first timer that determines when the switching time begins and ends,
switch to a low power BWP within the second BWP, and
operate a second timer that determines when the low power BWP begins and ends,
wherein the second timer starts and stops while the first timer is running.

17. The UE of claim 16, wherein the one or more processors, to switch to the low power BWP, are configured to:
receive an indication to switch to the low power BWP; and
switch to the low power BWP during the switching time based at least in part on the indication.

18. The UE of claim 15, wherein the one or more processors are configured to:
switch to a first low power BWP within the first BWP before a first timer starts, wherein the first timer determines when the switching time begins and ends;
operate a second timer that determines when the first low power BWP begins and ends; and
switch to a second low power BWP within the second BWP based at least in part on a third timer that determines when the second low power BWP begins and ends, wherein the third timer starts and stops while the first timer is running.

19. The UE of claim 1, wherein the one or more processors, to switch to the second BWP, are configured to switch to the second BWP based at least in part on a power saving configuration identifier.

20. The UE of claim 1, wherein the second BWP is a default BWP.

21. The UE of claim 1, wherein the configuration indicates the second BWP.

22. The UE of claim 1, wherein the common reference signal resources are periodic resources.

23. A network entity for wireless communication, comprising:
one or more memories; and
one or more processors, coupled to the one or more memories, configured to:
transmit a configuration for common reference signal resources that are common across a first bandwidth part (BWP) and a second BWP within a component carrier,
wherein the first BWP is larger than the second BWP, and
wherein the common reference signal resources are adjusted for the first BWP based at least in part on the second BWP and one or more of the configuration or an indication of a pattern or procedure to be used within the first BWP;
switch from the first BWP to the second BWP based at least in part on the configuration; and
transmit or measure, in the second BWP, reference signals that are among the common reference signal resources.

24. The network entity of claim 23, wherein the common reference signal resources are associated with a power saving mode.

25. The network entity of claim 23, wherein the first BWP or the second BWP is associated with a power saving mode.

26. The network entity of claim 23, wherein the one or more processors are configured to transmit an update of parameters for the configuration, wherein the update indicates for which BWPs or power saving modes the update applies.

27. The network entity of claim 23, wherein the one or more processors, to transmit the configuration, are configured to transmit the configuration in a system information block while in a user equipment is in an idle mode.

28. A method of wireless communication performed by a user equipment (UE), comprising:
receiving a configuration for common reference signal resources that are common across a first bandwidth part (BWP) and a second BWP within a component carrier,
wherein the first BWP is larger than the second BWP, and
wherein the common reference signal resources are adjusted for the first BWP based at least in part on the second BWP and one or more of the configuration or an indication of a pattern or procedure to be used within the first BWP;
switching from the first BWP to the second BWP based at least in part on the configuration; and
transmitting or measuring, in the second BWP, reference signals that are in the common reference signal resources.

29. A method of wireless communication performed by a network entity, comprising:
transmitting a configuration for common reference signal resources that are common across a first bandwidth part (BWP) and a second BWP within a component carrier,
wherein the first BWP is larger than the second BWP, and
wherein the common reference signal resources are adjusted for the first BWP based at least in part on the second BWP and one or more of the configuration or an indication of a pattern or procedure to be used within the first BWP;
switching from the first BWP to the second BWP based at least in part on the configuration; and transmitting or measuring, in the second BWP, reference signals that are among the common reference signal resources.

30. The UE of claim 1, wherein the common reference signal resources include resources for one or more of a channel state information reference signal (CSI-RS), a tracking reference signal (TRS), or a sounding reference signal (SRS).

* * * * *